United States Patent [19]

Hawkins et al.

[11] Patent Number: 4,899,181

[45] Date of Patent: Feb. 6, 1990

[54] LARGE MONOLITHIC THERMAL INK JET PRINTHEAD

[75] Inventors: William G. Hawkins, Webster; Donald J. Drake, Rochester, both of N.Y.

[73] Assignee: Xerox Corporation, Stamford, Conn.

[21] Appl. No.: 303,620

[22] Filed: Jan. 30, 1989

[51] Int. Cl.$^4$ .......................... G01D 15/16; B41J 3/04

[52] U.S. Cl. ................................ 346/140 R; 156/647

[58] Field of Search .......................... 346/140; 156/647

[56] References Cited

U.S. PATENT DOCUMENTS

| | | | |
|---|---|---|---|
| Re. 32,572 | 1/1988 | Hawkins et al. | 156/626 |
| 4,638,337 | 1/1987 | Torpey et al. | 346/140 R |
| 4,774,530 | 9/1988 | Hawkins | 346/140 R |
| 4,786,357 | 11/1988 | Campanelli et al. | 156/633 |
| 4,829,324 | 5/1989 | Drake | 346/140 |

*Primary Examiner*—Joseph W. Hartary
*Attorney, Agent, or Firm*—Robert A. Chittum

[57] ABSTRACT

An improved thermal ink jet printhead and method of fabrication thereof is disclosed of the type formed by the mating and bonding of first and second substrates. The first substrate is silicon with {100} crystal plane surfaces and has anisotropically etched in one surface thereof a linear series of separate through recesses and a plurality of parallel, elongated ink channels grooves. The second substrate has a plurality of heating elements and addressing electrodes patterned on one surface thereof. The through recesses serve as a segmented ink reservoir with each segment having an ink inlet, and the elongated ink channel grooves having one end adjacent the segmented reservoir and the opposite end open to serve as ink droplet emitting nozzles. Each segment of the segmented reservoir is isolated from each other by dividing walls. The dividing walls strengthen the printhead, and the separate through recesses reduce the effects of angular misalignment between mask and first substrate crystal planes. In the preferred embodiment, a thick film insulative layer is sandwiched between the first and second substrates and patterned to form recesses therein to provide the means for placing the segmented reservoir into communication with the ink channel grooves. To produce a multicolor printing printhead, the thick film layer is patterned to form a linear series of recesses, each substantially equal in length to an associated one of the reservoir segments, so that each reservoir segment may have a different colored ink supplied thereto that cannot mix with the ink of the other reservoir segments.

4 Claims, 5 Drawing Sheets

LARGE MONOLITHIC THERMAL INK JET PRINTHEAD

BACKGROUND OF THE INVENTION

1. Field of the Invention

This invention relates to ink jet printing devices, and more particularly to larger silicon thermal ink jet printheads which have ink passageways fabricated by anisotropic etching of silicon. The invention reduces effects of angular misalignment between the etchant resistant mask and the silicon substrate {111} crystal plane in order to provide increased dimensional control of ink passageways and to produce printheads that are more robust without sacrificing resolution.

2. Description of the Prior Art

Thermal ink jet printing is a type of drop-on-demand ink jet system, wherein an ink jet printhead expels ink droplets on demand by the selective application of a current pulse to a thermal energy generator, usually a resistor, located in capillary-filled, parallel ink channels a predetermined distance upstream from the channel nozzles or orifices. The channel ends opposite the nozzles are in communication with an ink reservoir to which an external ink supply is connected.

U.S. Pat. No. Re. 32,572 to Hawkins et al discloses a thermal ink jet printhead and several fabricating processes therefor. Each printhead is composed of two parts aligned and bonded together. One part is a substantially flat substrate which contains on the surface thereof a linear array of heating elements and addressing electrodes, and the second part is a substrate having at least one recess anisotropically etched therein to serve as an ink supply manifold when the two parts are bonded together. A linear array of parallel grooves is also formed in the second part, so that one end of each groove communicates with the manifold recess and the other end of each groove is open for use as an ink droplet expelling nozzle. Many printheads can be made simultaneously be producing a plurality of sets of heating element arrays with their addressing electrodes on a silicon wafer and by placing alignment marks thereon at predetermined locations. A corresponding plurality of sets of channel grooves and associated manifolds are produced in a second silicon wafer. In one embodiment, alignment openings are etched in the second silicon wafer at predetermined locations. The two wafers are aligned via the alignment openings and alignment marks, then bonded together and diced into many separate printheads.

U.S. Pat. No. 4,638,337 to Torpey et al discloses an improved thermal ink jet printhead similar to that of Hawkins et al, but has each of its heating elements located in a recess. The floor of the recess contains the heating elements, while the recess walls prevent the lateral movement of the bubbles toward the nozzle and, therefore, the sudden release of vaporized ink to the atmosphere, known as blow-out, which causes ingestion of air and interrupts the printhead operation whenever this event occurs. In this patent, a thick film organic structure such as Riston® or Vacrel® is interposed between the heater plate and the channel plate. The purpose of this layer is to have recesses formed therein directly above the heating elements to contain the bubble which is formed over the heating elements, thus enabling an increase in the droplet velocity without the occurrence of vapor blow-out and concomitant air ingestion.

U.S. Pat. No. 4,774,530 to Hawkins discloses the use of an etched thick film insulative layer to provide the flow path between the ink channels and the manifold, thereby eliminating the fabrication steps required to open the channel groove closed ends to the manifold recess, so that the printhead fabrication process is simplified.

U.S. Pat. No. 4,786,357 to Campanelli et al, discloses the use of a patterned thick film insulative layer between mated and bonded substrates. One substrate has a plurality of heating element arrays and addresing electrodes formed on the surface thereof and the other being a silicon wafer having a plurality of etched manifolds, with each manifold having a set of ink channels. The patterned thick film layer provides a clearance space above each set of contact pads of the addressing electrodes to enable the removal of the unwanted silicon material by dicing without the need for etched recesses therein. The individual printheads are produced subsequently by dicing the substrate having the heating element arrays.

As disclosed in the above-discussed patents, thermal ink jet printheads are basically fabricated from two substrates. One substrate contains the heating elements and the other contains ink recesses. When these two substrates are aligned and bonded together, the recesses serve as ink passageways. A plurality of each substrate is formed on separate wafers, so that the wafers may be aligned, mated, and diced into many individual printheads. The wafer for the plurality of sets of recesses is silicon and the recesses are formed by an anisotropic etching process. The anisotropic or orientation dependent etching has been shown to be a high yielding fabrication process for precise, miniature printheads. They are low cost, high resolution, electronically addressable printers with high reliability. Such printheads are usually about a quarter of inch wide and print samll swaths of information being translated across a stationary recording medium such as paper. The paper is then stepped the distance of one swath and the printing process continued until the entire page of paper is printed. This is a low speed process.

In efforts to increase the printing speed, larger arrays of nozzles are required. Each ink droplet emitting nozzle requires an ink channel which is in communication with an ink reservoir or manifold. In order to complete the etching from only one side of the wafer, the reservoir is etched through the wafer so that the open bottom may serve as an ink inlet. As the array size increases, so also does the reservoir and thus the ink inlet. As the area of the through etch for the reservoirs increase, the wafer strength diminishes and yield drops because many of the fragile wafers are damaged during subsequent assembly operations.

There is another problem associated with long troughs or recesses. If the sides of the vias formed in the etch resistant masks are not perfectly aligned with the {111} crystal planes of the (100) silicon wafers or substrates, the resulting etched recesses will undercut the mask via and follow the {111} crystal planes nevertheless. Thus, any angular misalignment of the mask relative to the {111} crystal planes of the wafer will result in a rectangular etch recess having longer and wider dimensions than desired, as shown in FIG. 4 discussed later. This undercutting gets more severe as the desired recess or through slot length increases. Since the undercutting is a variable, depending on the pattern-crystal plane misorientation of a particular wafer, it cannot be easily compensated for in the mask design.

SUMMARY OF THE INVENTION

It is an object of the present invention to minimize both the fragility problem and misorientation induced undercut problem associated with anisotropic etching of ink passages for larger printheads having increased numbers of droplet emitting nozzles without decrease in printing resolution.

It is another object of the invention to develop techniques which allow anisotropic etching fabrication to be applied to the formation of closely spaced rectangular structures with high aspect ratios.

It is still another object of the present invention to enable multicolor printing from a single printhead.

In the present invention, an improved thermal ink jet printhead and method of fabrication thereof is disclosed of the type formed by the mating and bonding of first and second substrates. The first substrate is silicon with {100} crystal plane surfaces and has anisotropically etched in one surface thereof a through recess and a plurality of parallel, elongated ink channels grooves, the second substrate having a plurality of heating elements and addressing electrodes patterned on one surface thereof. The through recess in the first substrate serves as an ink reservoir with an ink inlet, while the elongated ink channel grooves having one end adjacent the ink reservoir and opposite end being opened, serve as ink droplet emitting nozzles. Each heating element is located in a respective one of the ink channel grooves a predetermined distance upstream from the nozzles. Means are provided to place the ink channel grooves into communication with the through recess, so that selective application of current pulses representing digitized data to the heating elements eject and propel ink droplets from the nozzles to a recording medium. The improvement comprises providing a segmented reservoir in which each segment of the reservoir is isolated from each other by dividing walls. The segmented reservoir is produced by patterning an etch resistant mask and anisotropically etching a linear series of separate through recesses. Adjacent through recesses are separated by the dividing walls, each having opposing wall surfaces that are in separate segments. The dividing walls strengthen the printhead when the number of nozzles and thus the length of the reservoir are increased and concurrently reduce the effects of angular misalignment between mask and first substrate crystal planes.

In one embodiment, the means for providing communication between the ink channel grooves and the segmented reservoir is accomplished by sandwiching a thick film insulative layer between the first and second substrates. The thick film layer is patterned to form recesses therein which provide ink flow path between the segmented resevoir and the ink channel grooves. The thick film layer may be patterned to form a linear series of recesses, one for each separate through recess that forms the segmented ink reservoir, each recess in the thick film layer being substantially equal in length to an associated one of the reservoir segments, so that each reservoir segment may have a different colored ink supplied thereto. In this configuration, an integral color ink jet printhead is produced.

A more complete understanding of the present invention can be obtained by considering the following detailed description in conjunction with the accompanying drawings, wherein the like index numerals indicate like parts.

DESCRIPTION OF THE PREFERRED EMBODIMENT

According to U.S. Pat. No. 4,638,337 to Torpey et al and U.S. Pat. No. Re. 32,572 to Hawkins et al, thermal ink jet printheads may be mass produced be sectioning of at least two mated planar substrates containing on confronting surfaces thereof respective matched sets of linear arrays of heating elements with addressing electrodes and linear arrays of parallel elongated grooves, each set of grooves being interconnected with a common recess having an opening through the opposite substrate surface. The elongated grooves serve as ink channels, and the common recess serves as an ink reservoir or manifold. The recess opening is the ink inlet to which an ink supply is connected. Each ink channel contains a heating element and the sectioning operation, generally a dicing operation, opens the ends of the ink channels opposite the ends connecting with the manifold, if not already open, and forms the nozzle containing surface. After the sectioning operation, the heating elements are located at a predetermined location upstream from the nozzles. The main difference between the above identified patents is that Torpey et al contains an intermediate thick film polymer layer sandwiched between the mated substrates. The thick film layer is patterned to expose the heating elements, this effectively places the heating elements in a pit whose vertical walls inhibits vapor bubble growth in the direction parallel to the heating element surface. This prevents vapor blow-out and the resultant ingestion of air which produces a rapid printhead failure mode. U.S. Pat. No. 4,774,530 to Hawkins further improves the printhead of Torpey et al by using an additional etched recess in the thick film layer to provide a flow path between the ink channels and the manifold or reservoir, so that there is no need to remove the ink channel closed ends by additional dicing or etching steps.

When the arrays of ink channels are enlarged to increase the width of printed swaths of information and thus increase the printing speed, the reservoir which supplies ink to the channels is also lengthened. The removal of this much silicon throughout the wafer causes a dramatic loss of wafer strength and results in a very fragile channel plate wafer. The fragility problem is exacerbated by the fact that the {111} crystal planes are not only etch termination planes but also are cleavage planes. As discussed above, any angular misorientation of the etch resistant channel and reservoir mask with the {111} crystal planes of the wafer causes undercutting which gets more severe as the reservoir length increases. This invention relates to an ink jet printhead that overcomes those two problems with larger array printheads and further enables the production of an integral color ink jet printhead.

Figure 1:
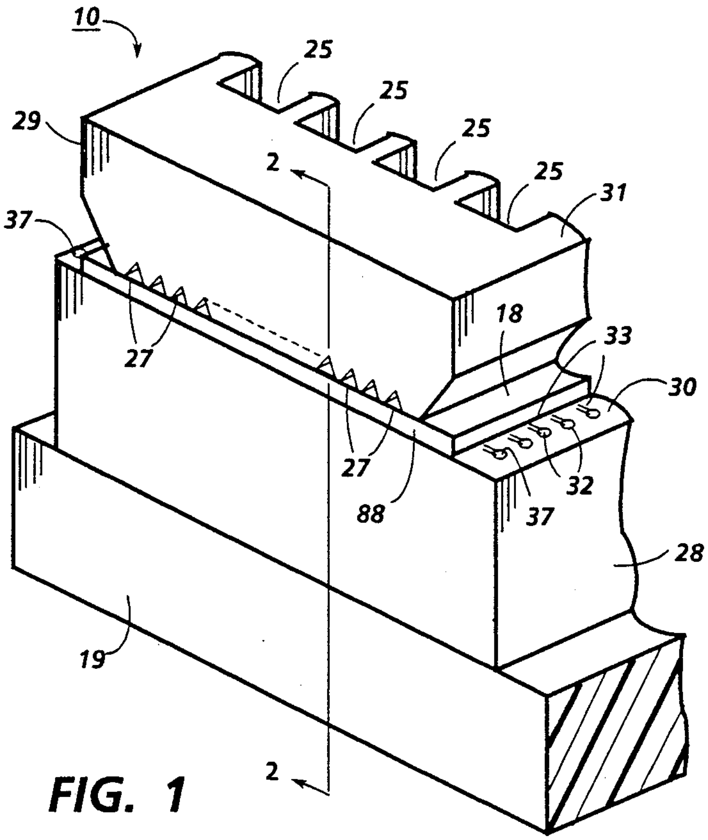
FIG. 1 is an enlarged schematic isometric view of a printhead mounted on a daughter board, showing the droplet emitting nozzles and separate inlets of the segmented reservoir of the present invention.
Figure 2:
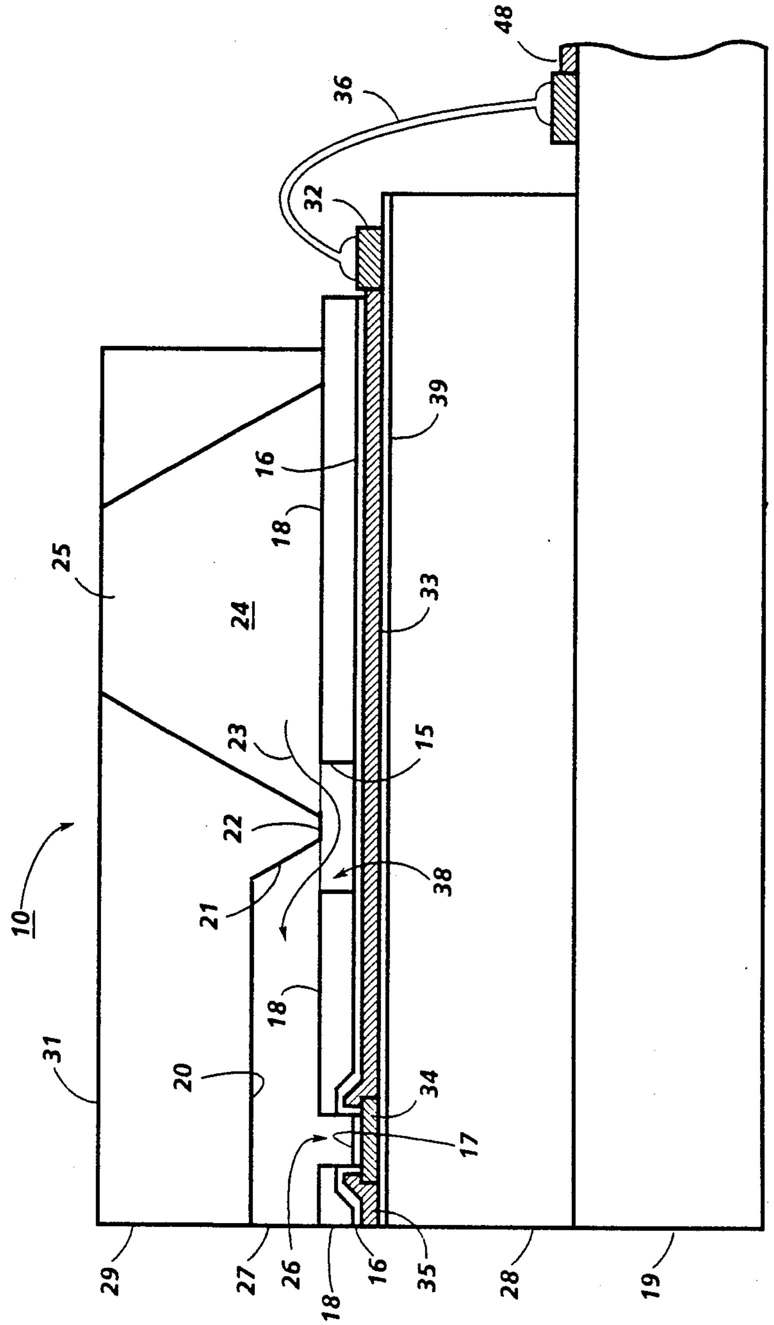
FIG. 2 is an enlarged cross sectional view of FIG. 1 as viewed along the line 2—2 thereof and showing the patterned thick film layer that provides an ink flow path between the segmented reservoir and the ink channels.

An enlarged, schematic isometric view of the front face 29 of the printhead 10 showing the array of droplet emitting nozzles 27 is depicted in FIG. 1. Referring also to FIG. 2, discussed later, the lower electrically insulating substrate or heating element plate 28 has at least the heating elements 34 and addressing electrodes 33 patterned on surface 30 thereof, while the upper substrate or channel plate 31 has parallel grooves 20 which extend in one direction and penetrate through the upper substrate front face edge 29. The other end of groves terminate at slanted wall 21. The through recesses 24, which are used as the ink supply manifold or reservoir for the capillary filled ink channels 20, has an open bottom 25 for use an an ink fill holes or inlets. The surface of the channel plate with the grooves are aligned and bonded to the heater plate 28, so that a respective one of the plurality of heating elements 34 is positioned in each channel, formed by the grooves and the lower substrate or heater plate. Ink enters the manifold formed by the recess 24 and the lower substrate 28 through the inlets 25 and, by capillary action, fills the associated channels 20 by flowing through one or more recesses 38 patterned in the thick film insulative layer 18, a photo-curable polymer, such as, for example, Riston® or Vacrel®. The ink at each nozzle forms a meniscus, the surface tension of which prevents the ink from weeping therefrom. The addressing electrodes 33 on the lower substrate or channel plate 28 terminate at terminals 32. The upper substrate or channel plate 31 is smaller than that of the lower substrate in order that the electrode terminals 32 are exposed and available for wire bonding to the electrodes on the daughter board 19, on which the printhead 10 is permanently mounted. Layer 18 is a thick film passivation layer, discussed later, sandwiched between upper and lower substrates. This layer is patterned to expose the heating elements, thus placing them in a pit 26, and is patterned to form a single elongated recess or a linear series of recesses 38 to enable ink flow between the manifold 24 and the associated ink channels 20. In addition, the thick film insulative layer is patterned to expose the electrode terminals.

A cross sectional view of FIG. 1 is taken along view line 2—2 thrugh one channel and shown as FIG. 2 to show how the ink flows from the manifold 24 and around the end 21 of the groove 20 as depicted by arrow 23. As is disclosed in U.S. Pat. No. 4,638,337 to Torpey et al, a plurality of sets of bubble generating heating elements 34 and their addressing electrodes 33 are patterned on the polished surface of a single side polished (100) silicon wafer. Prior to patterning, the multiple sets of printhead electrodes 33, the resistive material that serves as the heating elements, and the common return 35, the polished surface of the wafer is coated with an underglaze layer 39 such as silicon dioxide, having a thickness of about 2 micrometers. The resistive material may be a doped polycrystalline silicon which may be deposited by chemical vapor deposition (CVD) or any other well known resistive material, such as zirconium boride ($ZrB_2$). The common return and the addressing electrodes are typically aluminum leads deposited on the underglaze and over the edges of the heating elements. The common return ends or terminals 37 and addressing electrode terminals 32 are positioned at predetermined locations to allow clearance for wire bonding 36 to the electrodes 48 of the daughter board 19, after the channel plate 31 is attached to make a printhead. The common return 35 and the addressing electrodes 33 are deposited to a thickness of 0.5 to 3 micrometers, with the preferred thickness being 1.5 micrometers.

In the preferred embodiment, polysilicon heating elements are used and a silicon dioxide thermal oxide layer 17 is grown from the polysilicon in high temperature steam. The thermal oxide layer is typically grown to a thickness of 0.5 to 1 micrometer to protect and insulate the heating elements from the conductive ink. The thermal oxide is removed at the edges of the polysilicon heating elements for attachment of the addressing electrodes and common return, which are then patterned and deposited. If a resistive material such as zirconium boride is used for the heating elements, then other suitable well known insulative materials may be used for the protective layer thereover. Before electrode passivation and as disclosed in U.S. Pat. No. 4,774,530 to Hawkins, a tantalum (Ta) layer (not shown) may be optionally deposited to a thickness of about 1 micrometer on the heating element protective layer 17 for aded protection thereof against the cavitational forces generated by the collapsing ink vapor bubbles during printhead operation. The tantalum layer is etched off all but the protective layer 17 directly over the heating elements using, for example, $CF_4/O_2$ plasma etching. For electrode passivation, a two micrometer thick phosphorous doped CVD silicon dioxide film 16 is deposited over the entire wafer surface, including the plurality of sets of heating elements and addressing electrodes. The passivation film 16 provides an ion barrier which will protect the exposed electrodes from the ink. Other ion barriers may be used, such as, for example, polyimide, plasma nitride, as well as the above-mentioned phosphorous doped silicon dioxide, or any combinations thereof. An effective ion barrier layer is achieved when its thickness is between 1000 angstrom and 10 micrometers, with the preferred thickness being 1 micrometers. The passivation film or layer 16 is etched off of the terminal ends of the common return and addressing electrodes for wire bonding later with the daughter board electrodes. This etching of the silicon dioxide film may be by either the wet or dry etching method. Alternatively, the electrode passivation may be accomplished by plasma deposited silicon nitrite ($Si_3N_4$).

Next, a thick film type insulative layer 18 such as, for example, Riston®, Vacrel®, Probimer 52®, or polyimide, is formed on the passivation layer 16 having a thickness of between 10 and 100 micrometers and preferably in the range of 25 to 50 micrometers. The insulative layer 18 is photolithographically processed to enable patterning and removal of those portions of the layer 18 over each heating element (forming recesses or pits 26), the linear series of recesses 38 for providing ink passage from each separate manifold or reservoir 24 comprising the segmented reservoir 22 to the ink channels 20 associated with each reservoir 24 and inlet 25, and over each electrode terminal 32, 37. The recesses 38 are formed by the removal of these portions of the thick film layer 18. Thus, the passivation layer 16 alone protects the electrodes 33 from exposure to the ink in these recesses 38.

Figure 3:
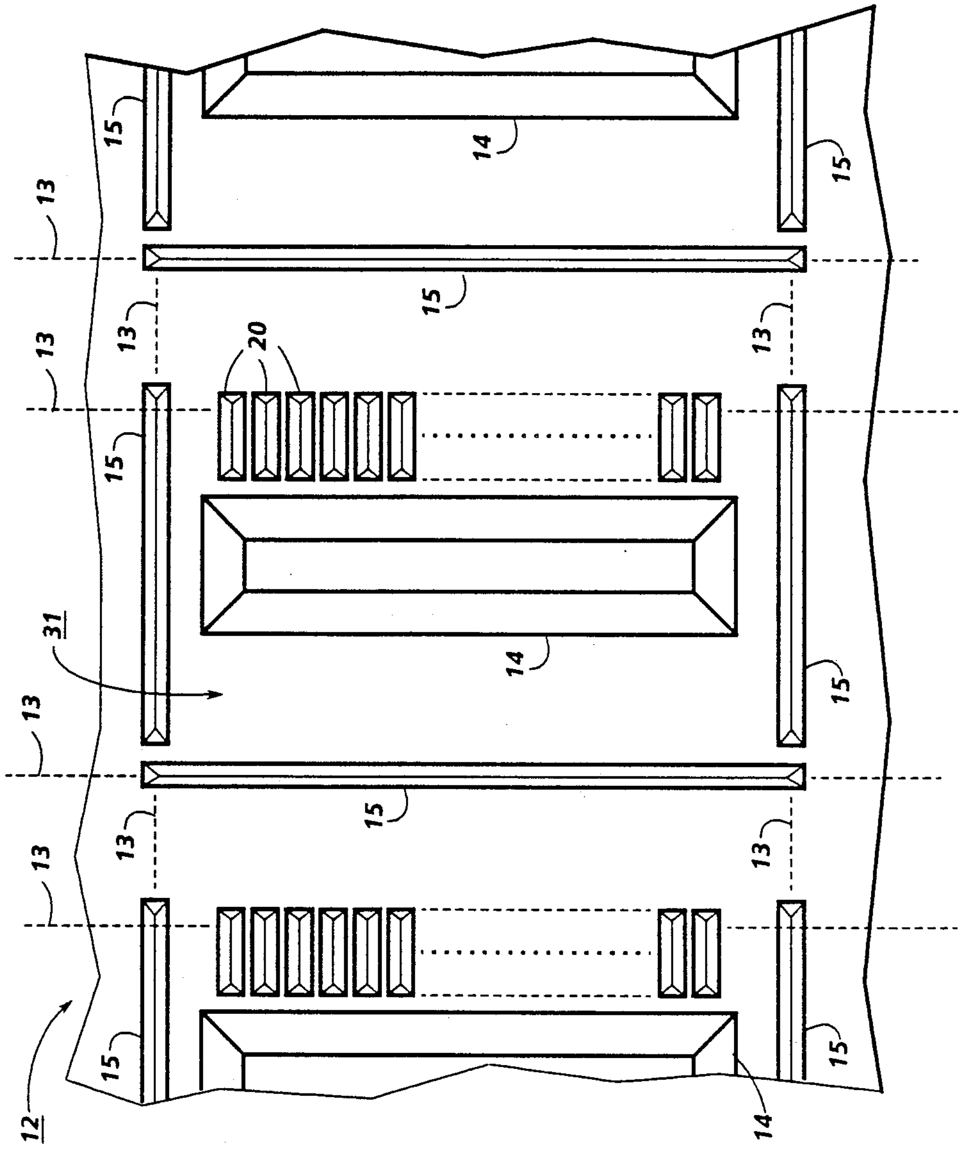
FIG. 3 is an enlarged, partially shown schematic plan view of an etched channel wafer having an increased array of ink channels.
Figure 5:
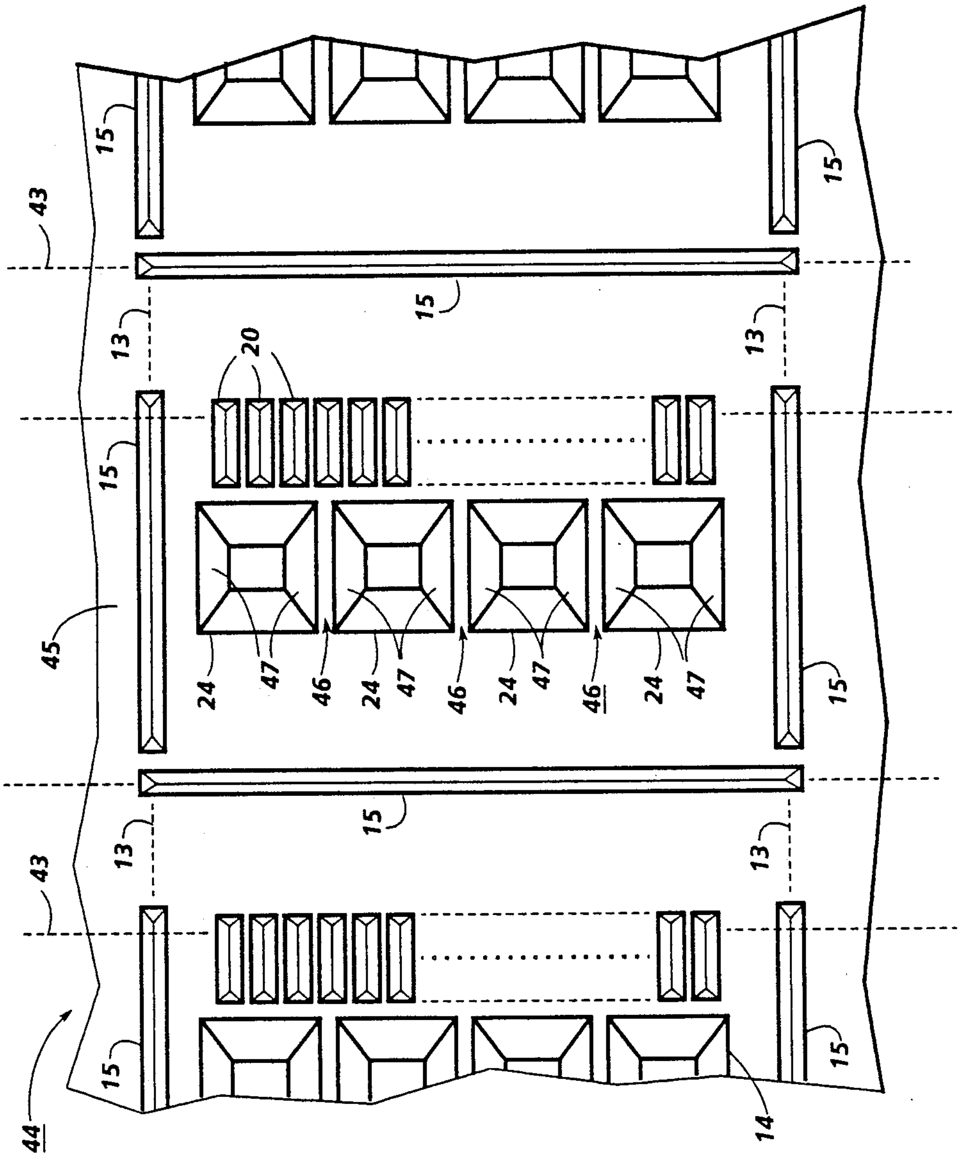
FIG. 5 is an enlarged, partially shown, schematic plan view of an etched channel wafer showing the segmented reservoir and inlets of the present invention.

Referring to FIG. 3, an enlarged, partially shown, plan view of a patterned and partially anisotropically etched channel plate wafer 12 for large array thermal ink jet printheads 10 is depicted. In a typical large array printhead 10, 200 ink channels 20 at 300 channels per inch covering the distance of about 0.66 inches are used. In FIG. 3, only a few channel grooves 20 are shown for clarity and ease of understanding the invention. Single through-etched reservoirs with open bottoms for use an ink inlets are shown to illustrate a fragile channel plate wafer and for comparison with the channel plate wafer in FIG. 5 depicting the present invention, discussed later. Elongated V-grooves 15 formed for providing clearance of the terminals of the addressing electrodes and common return as taught by the above referenced patents. Dashed lines 13 delineate the dicing lines for sectioning after the channel plate and heating element wafers are aligned and bonded together.

Figure 4:
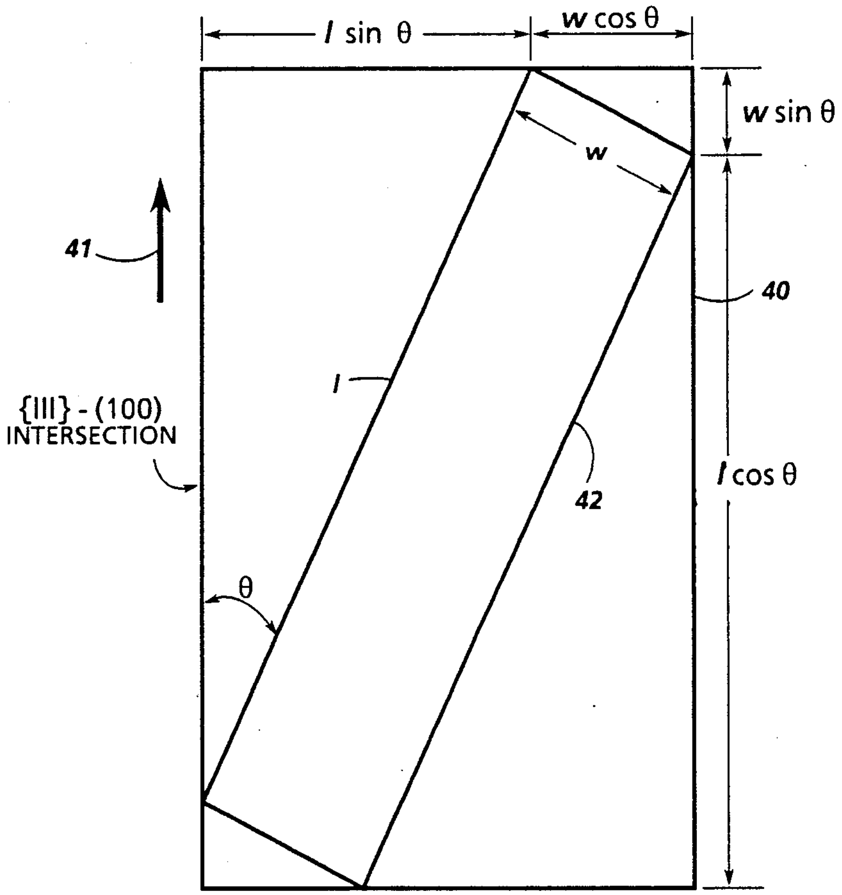
FIG. 4 is an enlarged schematic plan view of a mask via having angular misorientation of $\theta$ degrees with the {111} crystal planes of the silicon wafer.

With the development of larger arrays such as those shown and discussed in FIG. 3, the reservoir 14 has caused a problem in that it makes the etched silicon wafer 12 very fragile. After etching, the wafer must go through a hot phosphoric acid silicon nitride strip, a cool rinse, and then be mechanically aligned and bonded to the heating element wafer. In addition, there is another problem associated with the long, through-etched reservoir 14. FIG. 4 illustrates that the actual structure 40 resulting from some misalignment of the via pattern 42 to the {111} crystal planes, indicated by arrow 41, is a function of both the angular misorientation and the length "I" of the pattern. For example, the actual wdith "W" of the rectangular etched recess obtained by anisotropically etching the pattern, when it is misaligned with the {111} crystal plane by an angle $\theta$ degrees, is: $W=I \sin \theta + w \cos\theta$, where "w" is the pattern width. Note that the length "I" is a major component of the width increase caused by the misalignment. This undercutting gets more severe as the array length increase. Since the undercutting is a variable, depending on the pattern-crystal misorientation of a particular wafer, it cannot be easily compensated for in the mask.

Referring to FIG. 5 and as disclosed in U.S. Pat. Nos. Re. 32,572 and 4,638,337, a plurality of upper substrates or channel plates 31 for the printhead 10 is fabricated from a (100) silicon wafer 44. After the wafer is chemically cleaned, a pyrolytic CVD silicon nitride layer (not shown) is deposited on both sides. Using conventional photolithography, a plurality of linear sets of vias 24 for through-etched recesses that will serve as segmented ink reservoirs or manifolds 22 and at least two vias for alignment openings (not shown) at predetermined locations are printed on one wafer side. The silicon nitride is plasma etched off of the patterned vias representing the segmented reservoirs, with open bottoms for ink inlets 25, and alignment openings. A potassium hydroxide (KOH) anisotropic etch may be used to etch the reservoirs and alignment openings. In this case, the {111} planes of the (100) wafer make an angle of 54.7 degrees with the surface of the wafer. The reservoirs are equal square surface patterns and the alignment openings are both about 60 to 80 mils (1.5 to 2 mm) square. Thus, both are etched entirely through the 20 mil (0.5 mm) thick wafer. Concurrently, the wafer is photolithographically patterned to form both the elongated V-grooves 15, which provide clearnace for the electrode terminals 32, 37, and the sets of elongated, parallel channel recesses 20 that will eventually become the channels of the printheads. The surface 45 of the wafer 44 containing the segmented manifolds and channel recesses are portions of the original wafer surface (covered by a silicon nitride layer) on which adhesive will be applied later for bonding it to the substrate containing the plurality of sets of heating elements. A final dicing cut along dashed cut lines 43 produced end face 29 and opens one end of the elongated groove 20 producing nozzles 27. The other ends of the channel groove 20 remain closed by end 21. However, the alignment and bonding of the channel plate to the heater plate places the ends 21 of channels 20 directly over recesses 38 in the thick film insulative layer 18 sandwiched between the heating element and channel plate wafers, as shown in FIG. 2 enabling the flow of ink into the channels from the manifolds as depicted by arrows 23. The other dicing cuts along dashed dicing lines 13 complete the sectioning of the two bonded wafers into a plurality of individual, large array printheads. For monochrome printing, where the ink in the various separate reservoirs 24 making up the segmented reservoir 22 may be mixed, the thick film recess 38 may be a single elongated one. In other embodiment, discussed below, the thick film recesses must be patterned to produce one for each reservoir 24.

The via patterns which produce the linear series of through-etched recesses 24, the open bottoms 25 of which serve as separate ink inlets, are spaced from each other, so that individual reservoirs are formed which are separated from each other by dividing walls 46. The opposite surfaces 47 of the dividing walls form part of respective adjacent reservoirs. The linear series of reservoirs form a segmented reservoir 22, each segment 24 being the through-etched recess. The individual recesses 38 in the thick film layer 18 provides a separate ink flow paths to respective associated adjcent ink channels, so that each segment may be supplied with a different colored ink. Thus, this printhead configuration provides an integral color printhead as well as one which is more robust. The segmented reservoir increased the printhead strength and thus increases the yield over that obtainable with more fragile channel plate wafers which have single reservoirs for large arrays of ink channels. In addition, the smaller series of individual reservoirs which form the segmented reservoir, reduce the effects of angular misalignment between the mask and the channel plate wafer crystal planes.

In summary, this invention reduces the effects of angular misalignment between mask and wafer crystal planes by segmenting the large reservoirs. This concurrently provides a strengthened wafer which increases manufacturing yield, and, more importantly, enables the printhead to function as an integral full color printer.

Many modifications and variations are apparent from the foregoing description of the invention, and all such modifications and variations are intended to be within the scope of the present invention.

We claim:

1. An improved thermal ink jet printhead of the type formed by the mating and bonding of first and second substrates, the first substrate being silicon with {100} crystal plane surfaces and having anisotropically etched in one surface thereof a reservoir and a plurality of parallel, elongated ink channels grooves, the second substrate having a plurality of heating elements and addressing electrodes patterned on one surface thereof, and the elongated ink channel grooves having one end adjacent the ink reservoir and opposite end open to serve as ink droplet emitting nozzles, each heating element being located in a respective one of the ink channel grooves a predetermined distance upstream from the nozzles, and said printhead having means to place the ink channel grooves into communication with an ink supply, so that selective application of electrical pulses representing digitized data to the heating elements eject and propel ink droplets from the nozzles to a recording medium, wherein the improvement comprises:

said ink reservoir being segmented by dividing walls to provide a segmented reservoir in which each segment of the reservoir is isolated from each other, the segmented reservoir being produced by patterning an etch resistant mask and anisotropically etching a linear series of separate through recesses, adjacent through recesses being separated by dividing walls in which opposing wall surfaces are in separate segments, the dividing walls strengthening the printhead when the number of nozzles and thus the length of the reservoir are increased and reducing the effects of angular misalignment between mask and first substrate crystal planes.

2. The printhead of claim 1, wherein the improvement further comprises:

a thick film insulative layer sandwiched between the first and second substrates, the thick film layer being patterned to form recesses therein to provide the means for placing the segmented reservoir into communication with the ink channel grooves.

3. The printhead of claim 2, wherein the thick film layer is patterned to form a linear series of recess, one for each separate through recess that forms the segmented ink reservoir, each recess in the thick film layer being substantially equal in length to an associated one of the reservoir segments, so that each reservoir segment may have a different colored ink supplied thereto that cannot mix, whereby an integral color ink jet printhead is provided.

4. The printhead of claim 2, wherein the thick film layer is patterned to form a single recess capable of enabling communication between reservoir segments as well as between the ink channel grooves and the segmented reservoir, so that a single colored ink may be provided to the ink channel grooves and intermixed in the different segments of the segmented reservoir, whereby the number of nozzles may be increased without making the printhead fragile because of the increased length of the reservoir.

* * * * *